United States Patent
Shirasaka et al.

(10) Patent No.: US 11,097,344 B2
(45) Date of Patent: Aug. 24, 2021

(54) MULTILAYERED SINTERED PLATE AND MANUFACTURING METHOD THEREOF

(71) Applicant: OILES CORPORATION, Tokyo (JP)

(72) Inventors: Yasuhiro Shirasaka, Fujisawa (JP); Masato Ono, Fujisawa (JP)

(73) Assignee: OILES CORPORATION, Tokyo (JP)

(*) Notice: Subject to any disclaimer, the term of this patent is extended or adjusted under 35 U.S.C. 154(b) by 0 days.

(21) Appl. No.: 16/624,002

(22) PCT Filed: Jun. 8, 2018

(86) PCT No.: PCT/JP2018/022124
§ 371 (c)(1),
(2) Date: Dec. 18, 2019

(87) PCT Pub. No.: WO2019/009015
PCT Pub. Date: Jan. 10, 2019

(65) Prior Publication Data
US 2020/0171576 A1  Jun. 4, 2020

(30) Foreign Application Priority Data

Jul. 3, 2017 (JP) .............................. JP2017-130724

(51) Int. Cl.
*B22F 7/04* (2006.01)
*C22C 1/04* (2006.01)
*C22C 19/03* (2006.01)
*C22C 30/04* (2006.01)
(Continued)

(52) U.S. Cl.
CPC ................ *B22F 7/04* (2013.01); *B22F 9/082* (2013.01); *C22C 1/0433* (2013.01); *C22C 19/03* (2013.01); *C22C 30/04* (2013.01); *C22C 33/02* (2013.01); *C22C 38/002* (2013.01); *C22C 38/08* (2013.01); *B22F 2301/15* (2013.01);
(Continued)

(58) Field of Classification Search
None
See application file for complete search history.

(56) References Cited

U.S. PATENT DOCUMENTS 4,435,482 A * 3/1984 Futamura ............ C22C 32/0073
428/553
5,126,212 A * 6/1992 Yamada ................... B22F 5/00
428/139
(Continued)

FOREIGN PATENT DOCUMENTS

CN 107190206 * 9/2017 .............. B22F 1/025
JP 50-043006 4/1975
(Continued)

OTHER PUBLICATIONS

English machine translation of JP2017-039984, EPO, accessed Sep. 3, 2020.*
(Continued)

*Primary Examiner* — Xiaobei Wang
(74) *Attorney, Agent, or Firm* — Nixon & Vanderhye P.C.

(57) ABSTRACT

A manufacturing apparatus 1 has a leveler 3 which, while pulling out a steel plate starting with one end thereof and while transporting it, corrects the waviness and the like of the steel plate, which serves as a backing plate 2 and is constituted by a continuous strip having a thickness of 0.3 to 2.0 mm and provided as a hoop material by being wound into a coil shape.

13 Claims, 3 Drawing Sheets

(51) Int. Cl.
     *C22C 33/02*      (2006.01)
     *C22C 38/00*      (2006.01)
     *C22C 38/08*      (2006.01)
     *B22F 9/08*      (2006.01)
     *F16C 33/12*      (2006.01)

(52) U.S. Cl.
     CPC ......... *B22F 2301/35* (2013.01); *F16C 33/121* (2013.01); *Y10T 428/12042* (2015.01)

(56) References Cited

U.S. PATENT DOCUMENTS

| | | |
|---|---|---|
| 2010/0197534 A1 | 8/2010 | Yuasa et al. |
| 2016/0160824 A1 | 6/2016 | Iwata et al. |
| 2020/0095662 A1* | 3/2020 | Fukuda ................... C22C 38/34 |

FOREIGN PATENT DOCUMENTS

| | | |
|---|---|---|
| JP | 53-117149 | 10/1978 |
| JP | 10-001756 | 1/1998 |
| JP | 10-330868 | 12/1998 |
| JP | 11-173331 | 6/1999 |
| JP | 2005-163074 | 6/2005 |
| JP | 2009-035757 | 2/2009 |
| JP | 2016-109235 | 6/2016 |
| JP | 2017-039984 | 2/2017 |

OTHER PUBLICATIONS

International Search Report for PCT/JP2018/022124 dated Aug. 21, 2018, one (1) page.

* cited by examiner

MULTILAYERED SINTERED PLATE AND MANUFACTURING METHOD THEREOF

This application is the U.S. national phase of International Application No. PCT/JP2018/022124 filed Jun. 8, 2018 which designated the U.S. and claims priority to JP Patent Application No. 2017-130724 filed Jul. 3, 2017, the entire contents of each of which are hereby incorporated by reference.

TECHNICAL FIELD

The present invention relates to a multilayered sintered plate having a porous sintered alloy layer on one surface of a backing plate and a manufacturing method thereof, and more particularly to a multilayered sintered plate for use as a multilayered sliding member which is suitably used in a sliding portion of such as an internal combustion engine or a transmission under the presence of a lubricating oil containing an extreme pressure additive including chlorine, sulfur, or the like, as well as a manufacturing method thereof.

BACKGROUND ART

Multilayered sliding members have been proposed which are each comprised of a backing plate, a porous sintered alloy layer joined integrally on one surface of the backing plate and composed of a bronze-based copper alloy such as bronze, lead bronze, or phosphor bronze, and a coating layer of a synthetic resin composition filled in the pores of, and coated on the surface of, the porous sintered alloy layer. In addition, in order to improve the wear resistance, seizure resistance, and conformability of this porous sintered alloy layer, proposals have been made to add, for example, phosphorus, aluminum, bismuth, and the like to the porous sintered alloy layer.

PRIOR ART DOCUMENTS

Patent Documents

Patent Document 1: JP-A-50-43006
Patent Document 2: JP-A-53-117149
Patent Document 3: JP-A-11-173331
Patent Document 4: JP-A-10-330868
Patent Document 5: JP-A-2005-163074
Patent Document 6: JP-A-2017-39984

SUMMARY OF THE INVENTION

Problems that the Invention is to Solve

Incidentally, one reason that the bronze-based copper alloy is used for this type of porous sintered alloy layer lies in that it is possible to attain firm strength of bonding (anchor effect) to the porous sintered alloy layer of a sliding layer constituted of a synthetic resin composition filled in the pores of, and coated on the surface of, the porous sintered alloy layer, and in that even if wear has occurred in the sliding layer constituted of the synthetic resin composition owing to sliding friction with a mating member and a part of the porous sintered alloy layer is exposed on that sliding layer (sliding surface), excellent sliding characteristics such as friction and wear as a multilayered sliding member can be maintained by virtue of the excellent sliding performance exhibited by the exposed bronze-based copper alloy.

Such multilayered sliding members are used under numerous different conditions, e.g., under conditions such as a dry friction condition or an in-oil or oil lubricating condition. However, in use under the in-oil or oil lubricating condition, particularly in use under an extreme pressure condition where the surface pressure at the frictional surface is high and seizure ascribable to the fracture of the oil film is likely to occur and in the in-oil or oil lubricating condition in which the oil contains an extreme pressure additive including such as chlorine, sulfur and phosphorus, particularly sulfur, sulfidation corrosion can occur in the porous sintered alloy layer constituted of a bronze-based copper alloy in consequence of the generation of sulfides ($Cu_2S$, CuS, etc.) due to reaction between, on the one hand, the copper of the porous sintered alloy layer exposed at the sliding surface or a cut surface caused by cutting the multilayered sliding member and, on the other hand, the sulfur in the lubricating oil contained as the extreme pressure additive. The sulfides thus generated may be as defects which cause the strength of the porous sintered alloy layer to decline and promote the wear of the coating layer.

To overcome the above-described drawbacks, the present inventors earlier proposed a multilayered sliding member comprising: a backing plate having a steel plate; and a porous sintered alloy layer which is integrally joined to one surface of the backing plate and is composed of 30 to 60% by mass of iron or an iron-based alloy and 40 to 70% by mass of a nickel-phosphorus alloy (Patent Document 6).

The multilayered sliding member according to the proposal by the present inventors is capable of suppressing the progress of sulfidation corrosion and excels in friction and wear characteristics even under an in-lubricating oil condition, particularly even under an in-oil or oil lubricating condition using a lubricating oil containing an extreme pressure additive including such as sulfur.

By focusing on the porous sintered alloy layer described in Patent Document 6 having the effect of sulfidation corrosion resistance, the present inventors devised the present invention upon finding that the porous sintered alloy layer which contains iron, nickel, and phosphorus as well as a predetermined amount of tin with respect thereto and is formed by sintering an atomized alloy powder produced from iron, nickel, phosphorus, and tin does not further cause sulfidation corrosion and substantially improves the wear resistance of the porous sintered alloy layer.

The present invention has been devised in view of the above-described aspects, and its object is to provide a multilayered sintered plate having a porous sintered alloy layer which is more unlikely to cause sulfidation corrosion and is more excellent in wear resistance even under an in-oil or oil lubricating condition using a lubricating oil containing an extreme pressure additive including such as sulfur, as well as a manufacturing method thereof.

Means for Solving the Problems

A multilayered sintered plate in accordance with the present invention comprises: a backing plate; and a porous sintered alloy layer which is integrally joined to one surface of the backing plate, wherein the porous sintered alloy layer is composed of 30 to 50% by mass of nickel, 1 to 10% by mass of phosphorus, 2.5 to 10% by mass of tin, and the balance iron and inevitable impurities, and has a structure which includes a matrix phase containing an iron-nickel-tin alloy and a hard phase precipitated in the matrix phase and containing a nickel-phosphorus-iron-tin alloy.

According to the multilayered sintered plate of the present invention, the porous sintered alloy layer has a structure which includes a matrix phase containing an iron-nickel-tin alloy and a hard phase precipitated in the matrix phase and containing a nickel-phosphorus-iron-tin alloy. As a result, the porous sintered alloy layer has substantially improved wear resistance and does not undergo a failure such as sulfidation corrosion even in an in-lubricating oil or lubricating oil supplied condition in which the lubricating oil contains an extreme pressure additive such as sulfur, so that exfoliation ascribable to sulfidation corrosion or the like does not occur in the coating layer of the synthetic resin composition which is filled and coated.

A method of manufacturing a multilayered sintered plate in accordance with the present invention which has a backing plate and a porous sintered alloy layer joined integrally to one surface of the backing plate, comprises the steps of: (a) preparing as the backing plate a steel plate formed of a ferritic, austenitic or martensitic stainless steel plate, or a rolled steel plate for general structure or a cold rolled steel plate; (b) producing a molten metal by melting raw material metals including predetermined amounts of simple substance iron, simple substance nickel, an iron-phosphorus alloy, a nickel-phosphorus alloy, and simple substance tin which are capable of obtaining an alloy composed of 30 to 50% by mass of nickel, 1 to 10% by mass of phosphorus, 2.5 to 10% by mass of tin, and the balance iron and inevitable impurities, and finely pulverizing the molten metal by an atomization process to thereby produce an atomized alloy powder; and (c) spreading the atomized alloy powder onto the one surface of the backing plate and sintering, in a sintering furnace adjusted to a reducing atmosphere, the thus-treated backing plate for 5 to 10 minutes at a temperature of 890° C. to 930° C., thereby integrally joining to the one surface of the backing plate a porous sintered alloy layer composed of 30 to 50% by mass of nickel, 1 to 10% by mass of phosphorus, 2.5 to 10% by mass of tin, and the balance iron and inevitable impurities, wherein the porous sintered alloy layer joined integrally to the one surface of the backing plate formed of the steel plate has a structure which includes a matrix phase containing an iron-nickel-tin alloy and a hard phase containing a nickel-phosphorus-iron-tin alloy precipitated in the matrix phase.

In the multilayered sintered plate in accordance with the present invention, the backing plate in a preferred embodiment may be constituted only by a ferritic, austenitic, or martensitic stainless steel (SUS) plate or may be comprised of such a stainless steel plate. As this stainless steel plate, cold rolled stainless steel plates are suitable. Among these, as JIS steel types of the ferritic stainless steel plate, it is possible to cite, for example, SUS 405, SUS 410L, SUS 429, SUS 430, SUS 434 SUS 436L, SUS 444, SUS 447J1, and the like. As JIS steel types of the austenitic stainless steel plate, it is possible to cite, for example, SUS 301, SUS 302, SUS 303, SUS 304, SUS 305, SUS 309, SUS 310, SUS 316, SUS 316L, SUS 317, SUS 321, SUS 347, SUS 384, and the like. Still further as JIS steel types of the martensitic stainless steel plate, it s possible to cite, for example, SUS 403, SUS 410. SUS 416. SUS 420, SUS 431, SUS 440, and the like.

In the case where the backing plate is formed of such a stainless steel plate, the one surface of the backing plate may be one surface of the stainless steel plate. Furthermore, the backing plate may have a stainless steel plate and a nickel coating covering a surface of this stainless steel plate. In the case of the backing plate having the nickel coating, the one surface of the backing plate may be one surface of the nickel coating.

The stainless steel plate has stable corrosion resistance since its surfaces are covered by a passive state film, so that the stainless steel plate does not particularly require a nickel coating. However, since this passive state film is ultrathin and fragile, a nickel coating may be formed on the stainless steel plate for the purpose of reinforcing, that passive state film.

In the multilayered sintered plate in accordance with the present invention, the backing plate in another preferred embodiment may be formed of a rolled steel plate for general structure (SS 400 or the like) defined in JIS G 3101 or a cold rolled steel plate (SPCC or the like) defined in JIS G 3141. In the case where the backing plate is formed of such a rolled steel plate for general structure or a cold rolled steel plate, the one surface of the backing plate may be one surface of the rolled steel plate for general structure or the cold rolled steel plate. In addition, the backing, plate may further have a nickel coating covering the surface of the rolled steel plate for general structure or the cold rolled steel plate. In the case of the hacking plate further having the nickel coating, the one surface of the backing plate may be one surface of the nickel coating.

The thickness of the above-described steel plate as the backing plate is preferably 0.3 to 2.0 mm, and the thickness of the nickel coating is preferably approximately 3 to 50 μm.

In the multilayered sintered plate using a steel plate having a nickel coating as the backing plate, since the porous sintered alloy layer is bonded to the one surface of the backing plate through the nickel coating, its bonding strength is enhanced, and corrosion resistance derived from the nickel coating is imparted to the backing plate.

In the method of manufacturing a multilayered sintered plate in accordance with the present invention, the atomized alloy powder is obtained by a process in which a molten alloy (molten metal), which is composed of 30 to 50% by mass of nickel, 1 to 10% by mass of phosphorus, 2.5 to 10% by mass of tin, and the balance iron and inevitable impurities and produced by appropriately selecting simple substance iron, simple substance nickel, an iron-phosphorus alloy, a nickel-phosphorus alloy, and simple substance tin, is collided against a fluid (a liquid or a gas) jetted at high speed so as to be finely pulverized and is cooled. A gas atomized alloy powder atomized by using a gas (inert gas or the like) as the fluid exhibits a spherical shape as its particle shape, whereas a water atomized alloy powder atomized by using a liquid (water or the like) as the fluid exhibits an irregular shape. In the multilayered sintered plate in accordance with the present invention, an atomized alloy powder of either shape may be used. In the case of the atomized alloy powder, alloying is promoted by the melting of iron, nickel, phosphorus, and tin, so that the porous sintered alloy layer which is obtained by sintering the atomized alloy powder improves the wear resistance more than the porous sintered alloy layer obtained by sintering a mixed powder of an atomized iron powder and a nickel-phosphorus alloy powder.

In the thus-produced atomized alloy powder, nickel is solid-dissolved in iron constituting a principal component to form a matrix phase containing an iron-nickel-tin alloy, thereby improving the strength of the porous sintered alloy layer and improving the wear resistance of the matrix phase. In addition, nickel generates a liquid phase containing a nickel-phosphorus-iron-tin alloy with phosphorus, tin and iron constituting the principal component which are described later, and the liquid phase precipitates in the matrix phase a hard phase containing a nickel-phosphorus-iron-tin alloy. If the content of nickel is less than 30% by mass, it is impossible to obtain improvement of the strength of the matrix phase constituted mainly of the iron-nickel alloy in the porous sintered alloy layer, and there is a possibility that the wear resistance and load carrying capacity become insufficient. On the other hand, if the content exceeds 50% by mass, there is a possibility of lowering the wear resistance of the porous sintered alloy layer. Accordingly, the content of nickel in the atomized alloy powder is 30 to 50% by mass, preferably 40 to 50% by mass.

Phosphorus generates a liquid phase containing a nickel-phosphorus-iron-tin alloy with nickel, iron and tin, and the liquid phase precipitates a hard phase containing a nickel-phosphorus-iron-tin alloy in the matrix phase. This hard phase containing the nickel-phosphorus-iron-tin alloy improves the wear resistance and load carrying capacity of the porous sintered alloy layer. If the content of phosphorus is less than 1% by mass, the proportion of the hard phase containing the nickel-phosphorus-iron-tin alloy is small, and an effect is not sufficiently demonstrated in the improvement of wear resistance. On the other hand, if the content exceeds 10% by mass, the hard phase containing the nickel-phosphorus-iron-tin alloy becomes excessively large, and there is a possibility of deteriorating the wear resistance to the contrary. Accordingly, the content of phosphorus in the porous sintered alloy layer is 1 to 10% by mass, preferably 3 to 7% by mass.

Tin is diffused in the matrix phase containing the iron-nickel alloy and the hard phase containing the nickel-phosphorus-iron alloy, strengthens the matrix phase and the hard phase, and improves the wear resistance. In addition, since tin makes it possible to effect the sintering of the atomized alloy powder at a low sintering temperature, it is possible to avoid causing early-stage damage, due to heat (sintering temperature), to a furnace core tube, a heater, a mesh belt, and the like installed in the sintering furnace, and reduce the maintenance frequency of the sintering furnace, with the result that the maintenance cost can be reduced. If the content of tin is less than 2.5% by mass, the aforementioned effects are not sufficiently demonstrated, whereas if the content exceeds 10% by mass, there is a possibility of lowering the wear resistance. Accordingly, the content of tin in the atomized alloy powder is 2.5% by mass to 10% by mass, preferably 2.5 to 7% by mass.

In the present invention, the porous sintered alloy layer of the atomized alloy powder, which is composed of 30 to 50% by mass of nickel, 1 to 10% by mass of phosphorus, 2.5 to 10% by mass of tin, and the balance iron and inevitable impurities, exhibits a metallic structure which includes a matrix phase containing an iron-nickel-tin alloy and a hard phase containing a nickel-phosphorus-iron-tin alloy precipitated in the matrix phase. In a preferred embodiment of the present invention, the micro Vickers hardness (HMV) of the matrix phase has at least 220 in terms of a mean value of measured values at 7 points of that matrix phase, while the micro Vickers hardness (HMV) of the hard phase has at least 700 in terms of a mean value of measured values at 7 points of that hard phase.

In the case where the backing plate is a stainless steel plate, a rolled steel plate for general structure, or a cold rolled steel plate, and the one surface of the backing plate is one surface of the stainless steel plate, the rolled steel plate for general structure, or the cold rolled steel plate, the atomized alloy powder spread uniformly onto the one surface of the backing plate is sintered in heating (sintering) furnace for 5 to 10 minutes at a temperature of 890° C. to 930° C., whereby nickel is solid-dissolved into the one surface of the backing plate and alloys that surface, and the bonding strength of the porous sintered alloy layer to the backing plate is increased. Also, a nickel-phosphorus-iron-tin alloy is interposed at the bonding interface between the porous sintered alloy layer and the backing plate, and firmly bonds the porous sintered alloy layer to the one surface of the backing plate, coupled with the alloying due to the solid solution of nickel at the interface. The thickness of the porous sintered alloy layer which is integrally bonded to the one surface of the backing plate is preferably approximately 0.1 to 0.5 mm, and the porosity is preferably not less than 20% and not more than 50%.

In the case where the backing plate is comprised of a stainless steel plate, a rolled steel plate for general structure, or a cold rolled steel plate and of a nickel coating covering one surface of the stainless steel plate, the rolled steel plate for general structure, or the cold rolled steel plate, the iron-nickel alloy in the matrix phase is diffused and solid-dissolved on the nickel coating and undergoes alloying, so that the porous sintered alloy layer can be bonded and integrated more firmly to the backing plate.

The multilayered sintered plate in accordance with the present invention may be used as a multilayered sliding member having a coating layer of a synthetic resin composition filled in the voids of, and coated on the surface of, a porous sintered alloy layer of the multilayered sintered plate.

The synthetic resin composition includes a synthetic resin constituting at least one principal component selected from a fluororesin, a polyether ether ketone resin, a polyamide resin, a polyacetal resin, a polyphenylene sulfide resin, and a polyamideimide resin, and at least one filler selected from a polyimide resin, a phenol resin-calcined product, a polyphenylene sulfone resin, an oxybenzoyl polyester resin, a barium sulfate, a magnesium silicate, and a phosphate. Furthermore, the synthetic resin composition may contain at least one solid lubricant selected from graphite, molybdenum, disulfide, tungsten disulfide, and boron nitride.

As specific examples of the synthetic resin composition, it is possible to cite, by way of example, (1) a synthetic resin composition composed of 5 to 30% by mass of a barium sulfate, 1 to 15% by mass of a magnesium silicate, 1 to 25% by mass of a phosphate, 0.5 to 3% by mass of a titanium oxide, and the balance a polytetrafluoroethylene resin (hereafter referred to as "PTFE") (2) a synthetic resin composition composed of 5 to 40% by mass of a barium sulfate, 1 to 30%, by mass of a phosphate, 1 to 10% by mass of one or more kinds of organic materials selected from a polyimide resin, a phenol resin-calcined product, and a polyphenylene sulfone resin, and the balance PTFE, (3) a synthetic resin composition composed of 6.5 to 11.5% by mass of an oxybenzoyl polyester resin, 1 to 12.5% by mass of a phosphate, 9.5 to 34.5% by mass of a barium sulfate, and the balance PTFE; and (4) a synthetic resin composition composed of 0.5 to 5% by mass of a polyhydric alcohol fatty acid ester derived from a saturated fatty acid and a polyhydric alcohol, 0.5 to 3% by mass of a jojoba oil, and the balance a polyacetal resin.

The thickness of the coating layer of the synthetic resin composition filled in the voids of, and coated on the surface of, the porous sintered alloy layer of the multilayered sintered plate in accordance with the present invention is set to 0.02 to 0.15 mm. In the case of a multilayered sliding member having that coating layer, even if wear has occurred in the coating layer owing to sliding friction with a mating member and a part of the porous sintered alloy layer is exposed on that coating layer, excellent sliding characteristics as a multilayered sliding member can be exhibited by virtue of the excellent sliding performance of the exposed porous sintered alloy layer.

Advantages of the Invention

According to the present invention, the porous sintered alloy layer has a structure which includes a matrix phase containing an iron-nickel-tin alloy and a hard phase containing a nickel-phosphorus-iron-tin alloy precipitated from a liquid phase generated in the matrix phase and containing the nickel-phosphorus-iron-tin alloy. As a result, it is possible to provide a multilayered sintered plate which has substantially improved wear resistance and does not undergo sulfidation corrosion even in an in-lubricating oil or lubricating oil supplied condition in which the lubricating oil contains an extreme pressure additive such as sulfur, as well as a manufacturing method thereof.

MODE FOR CARRYING OUT THE INVENTION

Next, a more detailed description will be given of the present invention and the mode for carrying it out on the basis of the preferred embodiments shown in the drawings. It should be noted that the present invention is not limited to these embodiments.

Figure 1:
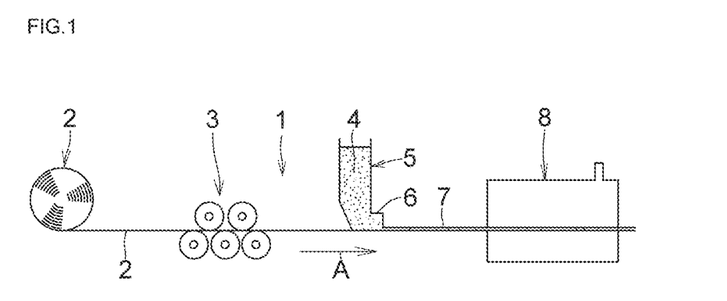
FIG. 1 is an explanatory view of an apparatus for manufacturing a multilayered sintered plate in accordance with a preferred embodiment of the invention.

A description will be given of a method of manufacturing a multilayered sintered plate in accordance with the present invention by using a manufacturing apparatus 1 as shown in FIG. 1.

The manufacturing apparatus 1 has a leveler 3 which, while pulling out a steel plate starting with one end thereof and while transporting it, corrects the waviness and the like of the steel plate, which serves as a backing plate 2 and is constituted by a continuous strip having a thickness of 0.3 to 2.0 mm and provided as a hoop material by being wound into a coil shape. The steel plate serving as the backing plate 2 may not necessarily be a continuous strip, but may be a strip cut into an appropriate length. In addition, the backing plate 2 may be comprised of a steel plate and a nickel coating formed on at least one surface of this steel plate.

The backing plate 2, while being transported in a direction A (transporting direction) by the leveler 3, is subjected to correction of waviness and the like. A hopper 5 with an alloy powder 4 stored therein is disposed on the downstream side of the leveler 3 in the direction A, and the alloy powder 4 stored in the hopper 5 is supplied (spread) onto the surface of the backing plate 2 which passed the leveler 3. A scraping plate 6 for smoothing the alloy powder 4 supplied onto the surface of the backing plate 2 is fixed at a lower end portion of the hopper 5, so that the alloy powder 4 which passed the scraping plate 6 is smoothed, thereby allowing an unsintered alloy powder layer 7 of a uniform thickness to be formed on one surface of the backing plate 2.

The alloy powder 4 stored in the hopper 5 is an atomized alloy powder.

The atomized alloy powder is produced as follows.

Simple substance iron, simple substance nickel, an iron-19 mass % phosphorus alloy, an iron-25 mass % phosphorus alloy, a nickel-4 to 12 mass % phosphorus alloy, and simple substance tin were prepared as raw material metals. From these raw material metals, an alloy raw material is produced which is composed of 30 to 50% by mass of nickel, 1 to 10% by mass of phosphorus, 2.5 to 10% by mass of tin, and the balance iron and inevitable impurities. The alloy raw material is melted to produce a molten alloy (molten metal), whereupon the molten metal is collided against a fluid (a liquid or a gas) jetted at high speed so as to be finely pulverized and is cooled, to thereby produce an atomized alloy powder which is composed of 30 to 50% by mass of nickel, 1 to 10% by mass of phosphorus, 2.5 to 10% by mass of tin, and the balance iron and inevitable impurities. With the atomized alloy powder thus produced, alloying is promoted by the melting of iron, nickel, phosphorus, and tin.

The particle shape of a gas atomized alloy powder produced by using a gas (inert gas) as a fluid for jetting the molten metal at high speed is spherical in shape, whereas the particle shape of a water atomized alloy powder produced by using a liquid (water) as the fluid is irregular in shape. The particle size of the atomized alloy powder is 44 to 149 μm (325 to 100 meshes).

As shown in FIG. 1, the backing plate 2 on one surface of which an unsintered atomized alloy powder layer with a uniform thickness without causing segregation has been formed is carried into a heating (sintering) furnace 8 adjusted to a reducing atmosphere of such as a vacuum or a hydrogen ($H_2$) gas, an $H_2$—nitrogen ($N_2$) mixed gas (25 vol. % $H_2$ and 75 vol. % $N_2$), or an ammonia cracked gas (AX gas: a mixed gas of 75 vol. % $H_2$ and 25 vol. % $N_2$), and is sintered in the heating surface 8 for 5 to 10 minutes at a temperature of 890 to 930° C. Through this sintering, nickel of the atomized alloy powder is diffused and solid-dissolved on the surface of the backing plate 2 to alloy the surface thereof, and enhances the bonding strength of the porous sintered alloy layer of the atomized alloy powder to the backing plate 2. Further, a nickel-phosphorus-iron-tin alloy of the atomized alloy powder is interposed at a bonding interface between the porous sintered alloy layer and the backing plate 2, and firmly bonds and integrates the porous sintered alloy layer to the backing plate 2, coupled with the alloying due to diffusion and solid solution of nickel at the interface. The thickness of the porous sintered alloy layer joined integrally to one surface of the backing plate 2 is generally set to 0.1 to 0.5 mm.

In the multilayered sintered plate using the backing plate 2 which is comprised of a steel plate and a nickel coating formed on the surface of the steel plate, since sintering progresses in a state in which nickel of the atomized alloy powder is mutually diffused on the nickel coating, the porous sintered alloy layer of the atomized alloy powder can be bonded more firmly to one surface of the backing plate 2.

Figure 2:
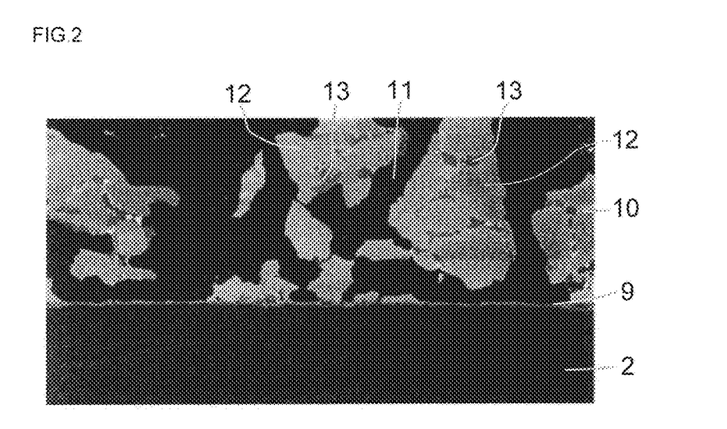
FIG. 2 is an explanatory view of a scanning electron microscope image of a cross-sectional structure of a porous sintered alloy layer in the preferred embodiment of the invention.
Figure 3:
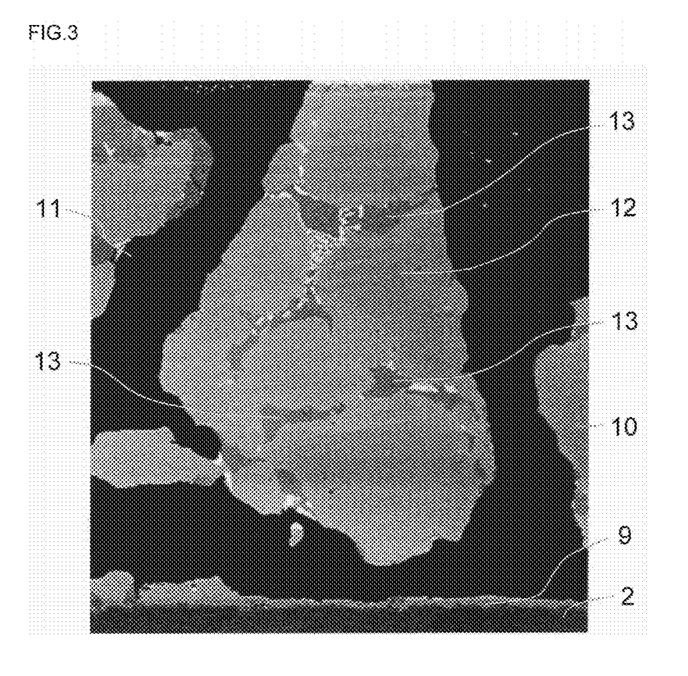
FIG. 3 is an explanatory view of a partially enlarged scanning electron microscope image of FIG. 2.

FIG. 2 is an explanatory view of a scanning electron microscope image (SEM image) of a cross section of a multilayered sintered plate in which a porous sintered alloy layer of an atomized alloy powder composed of 47% by mass of nickel, 3% by mass of phosphorus, 2.5% by mass of tin, and the balance iron and inevitable impurities is integrally joined to the surface of a nickel coating, i.e., one surface of the backing plate 2 consisting of a cold-rolled steel plate and a nickel coating formed on the surface of this cold-rolled steel plate. FIG. 3 is a partially enlarged SEM image of FIG. 2. In the drawings, reference numeral 2 denotes the backing plate; 9, a nickel coating provided on the surface of the backing plate 2; 10, a porous sintered alloy layer which is integrally diffused on and joined to one surface of the backing plate 2 through the nickel coating 9; 11, a void formed in the porous sintered alloy layer 10; 12, a matrix phase containing an iron-nickel-tin alloy of the porous sintered alloy layer 10; and 13, a hard phase containing a nickel-phosphorus-iron-tin alloy which is precipitated from a liquid phase generated in the matrix phase 12 and containing the nickel-phosphorus-iron-tin alloy.

When measurement was made of the micro Vickers hardness (HMV) of the matrix phase 12 containing the iron-nickel-tin alloy and of the hard phase 13 containing the nickel-phosphorus-iron-tin alloy in the porous sintered alloy layer 10, the micro Vickers hardness of the matrix phase 12 showed 264 in terms of a mean value of measured values at 7 points of that matrix phase 12, while the micro Vickers hardness of the hard phase 13 showed 796 in terms of a mean value of measured values at 7 points of that hard phase 13.

The porous sintered alloy layer 10 of the atomized alloy powder, which is thus joined integrally to one surface of the backing plate 2 and is composed of 30 to 50% by mass of nickel, 1 to 10% by mass of phosphorus, 2.5 to 10% by mass of tin, and the balance iron and inevitable impurities, has a structure which includes the matrix phase containing the iron-nickel-tin alloy and the hard phase containing the nickel-phosphorus-iron-tin alloy precipitated from a liquid phase generated in the matrix phase and containing the nickel-phosphorus-iron-tin alloy. The micro Vickers hardness (HMV) of the matrix phase has at least 220 in terms of a mean value of measured values at 7 points of that matrix phase, while the micro Vickers hardness of the hard phase has at least 700 in terms of a mean value of measured values at 7 points of that hard phase. Therefore, in sliding friction with a mating member, the hard phase containing the nickel-phosphorus-iron-tin alloy is capable of bearing a heavier load than the matrix phase containing the iron-nickel-tin alloy, which is softer than the hard phase, so that the wear resistance of the porous sintered alloy layer 10 is enhanced.

Next, a description will be given of a multilayered sliding member having a coating layer of a synthetic resin composition filled in the voids of, and coated on the surface of, the porous sintered alloy layer of the multilayered sintered plate.

As one example of the synthetic resin composition, a petroleum-based solvent in an amount of not less than 15 and not more than 30 parts by mass is compounded with 100 parts by mass of a mixture containing PTFE, a barium sulfate, a phosphate, and a filler consisting of organic material, the mixture being obtained by agitating and mixing by a Henschel mixer 5 to 40% by mass of a barium sulfate, 1 to 30% by mass of a phosphate, 1 to 10% by mass of a filler consisting of one or more kinds of organic materials selected from a polyimide resin, a phenol resin-calcined product, and a polyphenylene sulfone resin, and the balance PTFE. The compounded admixture is mixed at a temperature of not more than the room-temperature transition point (19° C.) of PTFE, preferably at a temperature of 10 to 18° C., to thereby fabricate a synthetic resin composition with wettability imparted thereto. This synthetic resin composition with wettability imparted thereto is supplied to and spread over the porous sintered alloy layer of the above-described multilayered sintered plate and is rolled by a roller to allow the synthetic resin composition to be filled in the voids of the porous sintered alloy layer and form on the surface of the porous sintered alloy layer a coating layer constituted of the synthetic resin composition with a uniform thickness. Subsequently, the multilayered sintered plate having the coating layer of the synthetic resin composition filled in and coated on the porous sintered alloy layer is held for several minutes in a drying furnace heated to a temperature of 200 to 250° C. to remove the petroleum-based solvent, and is then subjected to pressure roller treatment under a pressure of 300 to 600 kgf/cm$^2$ to form the dried synthetic resin composition into a predetermined thickness by a roller. This semi-processed product is introduced into the heating furnace and is sintered by being heated at a temperature of 360 to 380° C. for a period between several minutes and 10 and several minutes, and is then removed out of the furnace and is subjected to roller treatment again to adjust the variation of the size. A multilayered sliding member is thereby obtained which is provided with the coating layer filled in the voids of, and coated on the surface of, the porous sintered alloy layer of the multilayered sintered plate. The thickness of the coating layer formed of the synthetic resin composition in the multilayered sliding member is set to 0.02 to 0.15 mm.

Even when the coating layer (sliding surface) constituted of the synthetic resin composition has become worn owing to sliding friction with the mating member, and the porous sintered alloy layer is partially exposed on that coating layer to cause sliding friction with the mating member to shift to the sliding surface where both thereof are mixedly present, since the exposed porous sintered alloy layer of the atomized alloy powder excels in wear resistance, the multilayered sliding member thus fabricated is able to exhibit excellent sliding characteristics as the multilayered sliding member, coupled with the low friction property of the coating layer.

EXAMPLES

Example 1

A strip was prepared which was obtained by cutting a cold rolled steel plate (SPCC) with a thickness of 0.70 mm into a size of a 170 mm width and a 600 mm length. Nickel coating with a thickness of 20 μm was provided on the entire surfaces of this strip including one surface by nickel electroplating, and this strip was used as the backing plate.

Simple substance iron, simple substance nickel, a nickel-4 mass % phosphorus alloy, and simple substance tin were prepared as raw material metals. From these raw material metals, measurement was made of 25% by mass of a nickel-4 mass % phosphorus alloy, 23.5% by mass of simple substance nickel, 49% by mass of simple substance iron, and 2.5% by mass of simple substance tin. A molten metal obtained by dissolving these raw material metals was collided against a fluid (inert gas) jetted at high speed so as to be finely pulverized and was cooled, to thereby produce an atomized alloy powder which was composed of 47.5% by mass of nickel, 1% by mass of phosphorus, 2.5% by mass of tin, and 49% by mass of the balance iron and inevitable impurities. The particle size of this atomized alloy powder was 45 to 150 μm.

The atomized alloy powder was spread onto the surface of the nickel coating on one surface of the above-described backing plate degreased and cleaned with acetone in advance, and an unsintered atomized alloy powder layer with a uniform thickness was thereby fabricated. Subsequently, the thus-treated backing plate was carried into a sintering furnace adjusted to a reducing atmosphere of a hydrogen-nitrogen mixed gas (25 vol. % H$_2$ and 75 vol. %

N$_2$), and was sintered for 10 minutes at a temperature of 890° C., thereby obtaining a multilayered sintered plate having a porous sintered alloy layer which was joined integrally to one surface of the backing plate through a nickel coating, had a thickness of 0.3 mm, and was composed of 47.5% by mass of nickel, 1% by mass of phosphorus, 2.5% by mass of tin, and 49% by mass of the balance consisting of iron and inevitable impurities. The porous sintered alloy layer of the multilayered sintered plate exhibited a structure which included a matrix phase containing an iron-nickel-tin alloy and a hard phase containing a nickel-phosphorus-iron-tin alloy which was precipitated from a liquid phase containing the nickel-phosphorus-iron-tin alloy and generated in the matrix phase. The micro Vickers hardness (MVH) of that matrix phase showed 220 in terms of a mean value of measured values at 7 points of that matrix phase, while the micro Vickers hardness (MVH) of the hard phase showed 878 in terms of a mean value of measured values at 7 points of that hard phase.

Example 2 to Example 9

Backing plates were prepared which each consisted of a cold-rolled steel plate similar to that of the above-described Example 1 and a 20 μm-thick nickel coating provided on the entire surfaces including one surface of this cold-rolled steel plate.

Simple substance iron, simple substance nickel, an iron-19 mass % phosphorus alloy, an iron-25 mass % phosphorus alloy, a nickel-4 to 12 mass % phosphorus alloy, and simple substance tin were prepared as raw material metals. Atomized alloy powders of component compositions shown in Table 1 to Table 3 were prepared by appropriately selecting from among these raw material metals, and multilayered sintered plates were obtained which each had a porous sintered alloy layer joined integrally to one surface of the backing plate through a nickel coating and had a thickness of 0.3 mm in the same way of Example 1. The porous sintered alloy layer of the multilayered sintered plate exhibited a structure which included a matrix phase containing an iron-nickel-tin alloy and a hard phase containing a nickel-phosphorus-iron-tin alloy which was precipitated from a liquid phase generated in the matrix phase and containing the nickel-phosphorus-iron-tin alloy. The micro Vickers hardness (MVH) of the matrix phase and the hard phase is shown in Table 1 to Table 3.

Comparative Example 1 (Corresponding to Example 2 of Patent Document 6)

A backing plate similar to that of the above-described Example 1 was prepared.

A mixed powder, which was produced by mixing for 30 minutes by a V-type mixer 50% by mass of an atomized iron powder of a particle size passing through a 200-mesh (74 μm) sieve and 50% by mass of an atomized nickel-11 mass % phosphorus alloy powder (44.5 mass % nickel and 5.5 mass phosphorus) of a particle size passing through a 350-mesh (44 μm) sieve, was spread into a uniform thickness onto one surface of a nickel coating degreased and cleaned with acetone in advance. This semi-finished product was sintered for 10 minutes at a temperature of 890° C. in the heating furnace adjusted to a reducing atmosphere of a hydrogen-nitrogen mixed gas (25 vol. % H$_2$ and 75 vol. % N$_2$), thereby fabricating a multilayered sintered plate in which a 0.3 min-thick porous sintered alloy layer constituted of a sintered alloy of the mixed powder composed of 50% by mass of the iron powder and 50% by mass of the nickel-11 mass % phosphorus alloy powder was integrally joined to one surface of the nickel coating. The porous sintered alloy layer of the multilayered sintered plate exhibited a structure which included a matrix phase containing an iron-nickel alloy and a hard phase containing a nickel-phosphorus alloy which was precipitated from a liquid phase generated at grain boundaries of that matrix phase and containing the nickel-phosphorus alloy. The micro Vickers hardness (MVH) of that matrix phase showed 260 in terms of a mean value of measured values at 7 points of that matrix phase, while the micro Vickers hardness (MVH) of the hard phase showed 620 in terms of a mean value of measured values at 7 points of that hard phase.

Comparative Example 2

Simple substance iron, simple substance nickel, and a nickel-8 mass % phosphorus alloy were prepared as raw material metals. From these raw material metals, measurement was made of 48% by mass of simple substance iron, 15% by mass of simple substance nickel, and 37% by mass of a nickel-8 mass % phosphorus alloy. A molten metal obtained by dissolving these raw material metals was collided against a fluid (inert gas) jetted at high speed so as to be finely pulverized and was cooled, to thereby produce an atomized alloy powder which was composed of 49% by mass of nickel, 3% by mass of phosphorus, and 48% by mass of the balance iron and inevitable impurities. The particle size of this atomized alloy powder was 45 to 106 μm.

The atomized alloy powder was spread onto the surface of the nickel coating on one surface of the above-described backing plate to produce an unsintered atomized alloy powder layer with a uniform thickness. Subsequently, the thus-treated backing plate was carried into the sintering furnace adjusted to a reducing atmosphere of a hydrogen-nitrogen mixed gas (25 vol. % H$_2$ and 75 vol. % N$_2$), and was sintered for 10 minutes at a temperature of 890° C. After being allowed to cool, the sintered backing plate was taken out from the sintering furnace, and it was confirmed that the porous sintered alloy layer was not integrally joined to one surface of the backing plate via a nickel coating.

Comparative Example 3

A backing plate and an atomized alloy powder similar to that of Comparative Example 2 were prepared, the atomized alloy powder being composed of 49% by mass of nickel, 3% by mass of phosphorus, and 48% by mass of the balance iron and inevitable impurities. The atomized alloy powder was spread onto the surface of the nickel coating on one surface of the backing plate to produce an unsintered atomized alloy powder layer with a uniform thickness. Subsequently, the thus-treated backing plate was carried into the sintering furnace adjusted to a reducing atmosphere of a hydrogen-nitrogen mixed gas (25 vol. % H$_2$ and 75 vol. % N$_2$), and was sintered for 10 minutes at temperatures of 900° C., 910° C., 920° C., and 930° C., respectively. After being allowed to cool, the sintered backing plate was taken out from the sintering furnace, and it was confirmed that only when sintering was effected at the sintering temperature of 930° C., the porous sintered alloy layer was integrally joined to one surface of the backing plate via a nickel coating. The porous sintered alloy layer of the multilayered sintered plate exhibited a structure which included a matrix phase containing an iron-nickel alloy and a hard phase containing a nickel-phosphorus-iron alloy which was precipitated from a liquid phase generated in that matrix phase and containing the nickel-phosphorus-iron alloy. The micro Vickers hardness (MVH) of that matrix phase showed 267 in terms of a mean value of measured values at 7 points of that matrix phase, while the micro Vickers hardness (MVH) of the hard phase showed 660 in terms of a mean value of measured values at 7 points of that hard phase.

Next, with respect to the multilayered sintered plates of Examples 1 to 9 and Comparative Examples 1 and 3, friction and wear characteristics were evaluated under the test conditions shown below. The results of evaluation are shown in Tables 1 to 4.

Test Conditions on Friction-Wear Characteristics of Multilayered Sintered Plate:
  Velocity: 1.3 m/min
  Load (surface pressure): 300 kgf/cm$^2$
  Test period: 20 hrs.
  Mating member: carbon steel for machine structural use (S45C)
  Lubrication: in-oil ("Daphne Super Multi Oil #32 (tradename)" manufactured by Idemitsu Kosan Co., Ltd.

Figure 4:
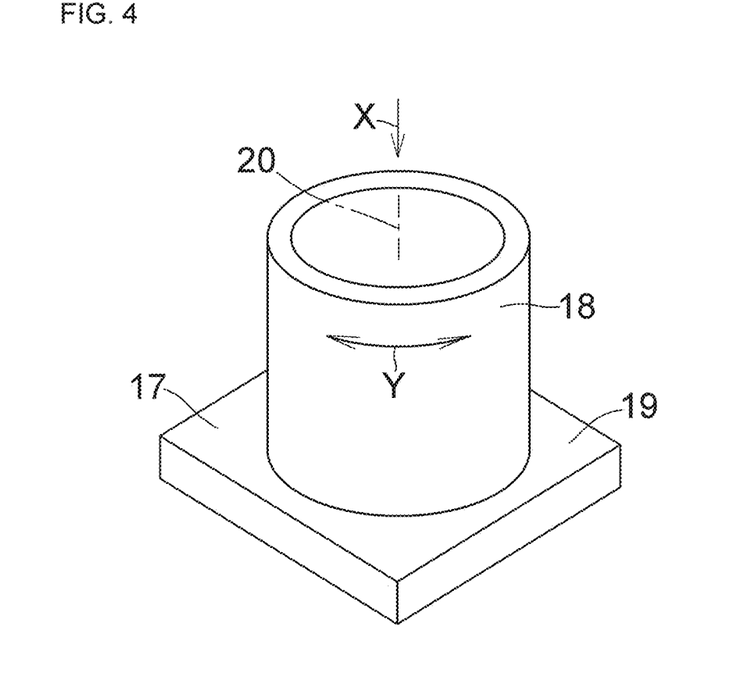
FIG. 4 is an explanatory perspective view for explaining a thrust test method.

Test Method of Friction-Wear Characteristics of Multilayered Sintered Plate:

As shown in FIG. 4, a square bearing test piece 17 having a side length of 30 mm and fabricated from each of the multilayered sintered plates of Examples 1 to 9 and Comparative Examples 1 and 3 was fixed to a test stand. While a predetermined load was being applied from a cylindrical body 18 serving as a mating member to one surface 19 of the bearing test piece 17 in a direction X perpendicular to the one surface 19, the cylindrical body 18 was rotated in a direction Y about an axis 20 of the cylindrical body 18, and measurement was made of the coefficient of friction between the bearing test piece 17 and the cylindrical body 18 and the amount of wear of the surface 19 after testing for 20 hours.

The test results are shown in Tables 1 to 4.

TABLE 1

|  | Examples | | |
| --- | --- | --- | --- |
|  | 1 | 2 | 3 |
| Component composition (mass %) of atomized alloy powder: | | | |
| Nickel | 47.5 | 47 | 45.5 |
| Phosphorus | 1 | 3 | 7 |
| Tin | 2.5 | 2.5 | 2.5 |
| Iron and inevitable impurities | balance (49) | balance (47.5) | balance (45) |
| Hardness (MVH) of matrix phase | 220 | 264 | 295 |
| Hardness (MVH) of hard phase | 878 | 796 | 863 |
| Friction and wear characteristics of multilayered sintered plate (surface pressure: 300 kgf/cm$^2$): | | | |
| Coefficient of friction | 0.12 | 0.09 | 0.10 |
| Amount of wear: after 20 hours of test time (μm) | 3 | 1 | 2 |

TABLE 2

|  | Examples | | |
| --- | --- | --- | --- |
|  | 4 | 5 | 6 |
| Component composition (mass %) of atomized alloy powder: | | | |
| Nickel | 50 | 46 | 45 |
| Phosphorus | 10 | 3 | 3 |
| Tin | 2.5 | 5 | 7 |
| Iron and inevitable impurities | balance (37) | balance (46) | balance (45) |
| Hardness (MVH) of matrix phase | 305 | 285 | 290 |
| Hardness (MVH) of hard phase | 880 | 785 | 780 |
| Friction and wear characteristics of multilayered sintered plate (surface pressure: 300 kgf/cm$^2$): | | | |
| Coefficient of friction | 0.11 | 0.09 | 0.09 |
| Amount of wear: after 20 hours of test time (μm) | 4 | 2 | 1 |

TABLE 3

| | Examples | | |
|---|---|---|---|
| | 7 | 8 | 9 |
| Component composition (mass %) of atomized alloy powder: | | | |
| Nickel | 44 | 43 | 40 |
| Phosphorus | 5 | 7 | 10 |
| Tin | 7 | 7 | 10 |
| Iron and inevitable impurities | balance (44) | balance (43) | balance (40) |
| Hardness (MVH) of matrix phase | 320 | 334 | 350 |
| Hardness (MVH) of hard phase | 800 | 765 | 700 |
| Friction and wear characteristics of multilayered sintered plate (surface pressure: 300 kgf/cm$^2$): | | | |
| Coefficient of friction | 0.10 | 0.11 | 0.13 |
| Amount of wear: after 20 hours of test time (μm) | 3 | 2 | 4 |

TABLE 4

| | Comparative Examples | | |
|---|---|---|---|
| | 1 | 2 | 3 |
| Component composition (mass %) of alloy powder: | | | |
| Nickel | 44.5 | | |
| Phosphorus | 5.5 | | |
| Iron and inevitable impurities | balance (50) | | |
| Component composition (mass %) of atomized alloy powder: | | | |
| Nickel | | 49 | 49 |
| Phosphorus | | 3 | 3 |
| Tin | | — | — |
| Iron and inevitable impurities | | balance (48) | balance (48) |
| Hardness (MVH) of matrix phase | 260 | — | 267 |
| Hardness (MVH) of hard phase | 620 | — | 660 |
| Friction and wear characteristics of multilayered sintered plate (surface pressure: 300 kgf/cm$^2$): | | | |
| Coefficient of friction | 0.12 | — | 0.10 |
| Amount of wear: after 20 hours of test time (μm) | 14 | — | 21 |

As for Comparative Example 2 in Table 4, since the porous sintered alloy layer was not integrally joined to one surface of the backing plate via a nickel coating, it was not possible to effect the evaluation of friction and wear characteristics.

From the test results, it can be appreciated that, in the multilayered sintered plates of Examples 1 to 9, the friction and wear characteristics, particularly wear resistance, is substantially improved. As can be seen from comparison between Example 2 and Comparative Example 3, tin was diffusively precipitated in each of the matrix phase and the hard phase of the porous sintered alloy layer in Example 2, and it can be conjectured that this precipitation of tin improved the wear resistance of the matrix phase and the hard phase and substantially improved the wear resistance of the porous sintered alloy layer.

In addition, since tin was contained in the atomized alloy powder for forming the porous sintered alloy layer, in the manufacture of multilayered sintered plates in Examples 1 to 9, the sintering temperature was in the range of 890 to 930° C. and it was thus possible to adopt a wide margin (50° C.) of the sinterable temperature, whereas, in the manufacture of multilayered sintered plates using the atomized alloy powders in Comparative Examples 2 and 3, the sintering temperature was 930° C. alone and it was not possible to adopt a margin of the sinterable temperature. This is attributable to the fact that since tin is contained in the atomized alloy powder, it is possible to lower the sintering temperature, so that it is possible to avoid causing early-stage damage, due to heat (sintering temperature), to a furnace core tube, a heater, a mesh belt, and the like installed in the heating (sintering) furnace, and reduce the maintenance frequency of the heating furnace. As a result, it is possible to produce a secondary effect that the maintenance cost can be substantially reduced.

As described above, the multilayered sintered plate in accordance with the invention has a porous sintered alloy layer which exhibits a structure including a matrix phase containing an iron-nickel-tin alloy and a hard phase containing a nickel-phosphorus-iron-tin alloy precipitated from a liquid phase generated in the matrix phase and containing the nickel-phosphorus-iron-tin alloy. As for the porous sintered alloy layer, its wear resistance is substantially improved by the precipitation of tin diffused in the matrix phase and the hard phase, and the porous sintered alloy layer does not undergo a failure such as sulfidation corrosion even in an in-lubricating oil or lubricating oil supplied condition in which the lubricating oil contains an extreme pressure additive such as sulfur, so that exfoliation ascribable to sulfidation corrosion or the like does not occur in the coating layer of the synthetic resin composition filled in and coated on the porous sintered alloy layer. Furthermore, in the manufacturing method, by using an atomized alloy powder containing tin, sintering can be effected at a low sintering temperature without causing segregation of the metal powder on one surface of the backing plate. Therefore, it is possible to avoid causing early-stage damage, due to the heat (sintering temperature), to a furnace core tube, a heater, a mesh belt, and the like installed in the heating (sintering) furnace, and reduce the maintenance frequency of the heating furnace. As a result, it is possible to substantially reduce the maintenance cost.

DESCRIPTION OF REFERENCE NUMERALS

1: manufacturing apparatus
2: backing plate
4: atomized alloy powder
5: hopper
7: unsintered atomized alloy powder layer
8: heating (sintering) furnace
9: nickel coating
10: porous sintered alloy layer
11: void
12: matrix phase
13: hard phase

The invention claimed is:

1. A multilayered sintered plate comprising: a backing plate; and a porous sintered alloy layer which is integrally joined to one surface of said backing plate, wherein said porous sintered alloy layer is consisting of 30 to 50% by mass of nickel, 1 to 10% by mass of phosphorus, 2.5 to 10% by mass of tin, and the balance iron and inevitable impurities, and has a structure which includes a matrix phase containing an iron-nickel-tin alloy and a hard phase precipitated in the matrix phase and containing a nickel-phosphorus-iron-tin alloy.

2. The multilayered sintered plate according to claim 1, wherein the matrix phase has a micro Vickers hardness (HMV) of at least 220, and the hard phase has a micro Vickers hardness (HMV) of at least 700.

3. The multilayered sintered plate according to claim 1, wherein the backing plate is comprised of a ferritic, austenitic, or martensitic stainless steel plate, and the one surface of said backing plate is one surface of the stainless steel plate.

4. The multilayered sintered plate according to claim 1, wherein said backing plate is comprised of a ferritic, austenitic, or martensitic stainless steel plate and of a nickel coating covering at least one surface of the stainless steel plate, and the one surface of said backing plate is one surface of the nickel coating.

5. The multilayered sintered plate according to claim 1, wherein said backing plate is comprised of a rolled steel plate for general structure or a cold rolled steel plate, and the one surface of said backing plate is one surface of the rolled steel plate for general structure or the cold rolled steel plate.

6. The multilayered sintered plate according to claim 1, wherein said backing plate is comprised of a rolled steel plate for general structure or a cold rolled steel plate and of a nickel coating covering one surface of the rolled steel plate for general structure or the cold rolled steel plate, and the one surface of said backing plate is one surface of the nickel coating.

7. A method of manufacturing a multilayered sintered plate having a backing plate and a porous sintered alloy layer joined integrally to one surface of the backing plate, comprising the steps of:
(a) preparing as the backing plate a steel plate formed of a ferritic, austenitic or martensitic stainless steel plate, or a rolled steel plate for general structure or a cold rolled steel plate;
(b) producing a molten metal by melting raw material metals including predetermined amounts of simple substance iron, simple substance nickel, an iron-phosphorus alloy, a nickel-phosphorus alloy; and simple substance tin which are capable of obtaining an alloy consisting of 30 to 50% by mass of nickel, 1 to 10% by mass of phosphorus, 2.5 to 10% by mass of tin; and the balance iron and inevitable impurities, and finely pulverizing the molten metal by an atomization process to thereby produce an atomized alloy powder; and
(c) spreading the atomized alloy powder onto the one surface of said backing plate and sintering, in a sintering furnace adjusted to a reducing atmosphere, said thus-treated backing plate for 5 to 10 minutes at a temperature of 890° C. to 930° C., thereby integrally joining to the one surface of said backing plate a porous sintered alloy layer composed of 30 to 50% by mass of nickel, 1 to 10% by mass of phosphorus, 2.5 to 10% by mass of tin, and the balance iron and inevitable impurities,
wherein the porous sintered alloy layer joined integrally to the one surface of said backing plate formed of the steel plate has a structure which includes a matrix phase containing an iron-nickel-tin alloy and a hard phase containing a nickel-phosphorus-iron-tin alloy precipitated in the matrix phase.

8. A multilayered sintered plate comprising: a backing plate; and a porous sintered alloy layer which is integrally joined to one surface of said backing plate, wherein said porous sintered alloy layer does not include copper and comprises 30 to 50% by mass of nickel, 1 to 10% by mass of phosphorus, 2.5 to 10% by mass of tin, and the balance iron and inevitable impurities, and has a structure which includes a matrix phase containing an iron-nickel-tin alloy and a hard phase precipitated in the matrix phase and containing a nickel-phosphorus-iron-tin alloy.

9. The multilayered sintered plate according to claim 8, wherein the matrix phase has a micro Vickers hardness (HMV) of at least 220, and the hard phase has a micro Vickers hardness (HMV) of at least 700.

10. The multilayered sintered plate according to claim 8, wherein the backing plate is comprised of a ferritic, austenitic, or martensitic stainless steel plate, and the one surface of said backing plate is one surface of the stainless steel plate.

11. The multilayered sintered plate according to claim 8, wherein said backing plate is comprised of a ferritic, austenitic, or martensitic stainless steel plate and of a nickel coating covering at least one surface of the stainless steel plate, and the one surface of said backing plate is one surface of the nickel coating.

12. The multilayered sintered plate according to claim 8, wherein said backing plate is comprised of a rolled steel plate for general structure or a cold rolled steel plate, and the one surface of said backing plate is one surface of the rolled steel plate for general structure or the cold rolled steel plate.

13. The multilayered sintered plate according to claim 8, wherein said backing plate is comprised of a rolled steel plate for general structure or a cold rolled steel plate and of a nickel coating covering one surface of the rolled steel plate for general structure or the cold rolled steel plate, and the one surface of said backing plate is one surface of the nickel coating.

* * * * *